US012117582B2

(12) United States Patent
Annavarapu Srinivas et al.

(10) Patent No.: US 12,117,582 B2
(45) Date of Patent: Oct. 15, 2024

(54) MODEL FOR COUPLED POROUS FLOW AND GEOMECHANICS FOR SUBSURFACE SIMULATION

(71) Applicant: ExxonMobil Technology and Engineering Company, Spring, TX (US)

(72) Inventors: Chandrasekhar Annavarapu Srinivas, Chennai (IN); Dakshina M. Valiveti, The Woodlands, TX (US); Vadim Dyadechko, The Woodlands, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 806 days.

(21) Appl. No.: 17/011,254

(22) Filed: Sep. 3, 2020

(65) Prior Publication Data

US 2021/0096276 A1    Apr. 1, 2021

Related U.S. Application Data

(60) Provisional application No. 62/908,645, filed on Oct. 1, 2019.

(51) Int. Cl.
*G01V 20/00* (2024.01)
*G06F 30/23* (2020.01)
*G06F 30/28* (2020.01)
*G06F 113/08* (2020.01)

(52) U.S. Cl.
CPC .............. *G01V 20/00* (2024.01); *G06F 30/23* (2020.01); *G06F 30/28* (2020.01); *G06F 2113/08* (2020.01)

(58) Field of Classification Search
CPC ...... G01V 20/00; G01V 99/005; G06F 30/23; G06F 30/28; G06F 2113/08
USPC ........................................................ 703/6, 10
See application file for complete search history.

(56) References Cited

U.S. PATENT DOCUMENTS

| 5,455,780 | A  | * | 10/1995 | Nguyen .................. E21B 43/04 |
| | | | | 702/6 |
| 7,177,764 | B2 | | 2/2007 | Stone |
| 7,707,018 | B2 | | 4/2010 | Shaw |
| 7,844,430 | B2 | | 11/2010 | Glenton et al. |
| 7,860,654 | B2 | * | 12/2010 | Stone ..................... G01V 11/00 |
| | | | | 73/152.05 |
| 8,184,502 | B2 | | 5/2012 | Chen et al. |

(Continued)

FOREIGN PATENT DOCUMENTS

WO    20190038212 A1    2/2019

*Primary Examiner* — John E Johansen
(74) *Attorney, Agent, or Firm* — ExxonMobil Technology and Engineering Company—Law Department (57) ABSTRACT

A method for generating a three-dimensional geomechanical model of a subsurface volume is provided. The geomechanical model may be used to predict changes in geomechanical stress in the grid (such as a three-dimensional unstructured grid), which may be caused by extraction from or injection into the reservoir. The geomechanical model may be generated by solving, in combination, the finite element method at the vertices of a respective cell in the grid for momentum balance and the finite volume method at the center of the respective cell for mass balance. In this way, one or both of rock displacement or pore flow may be solved using the geomechanical model.

18 Claims, 5 Drawing Sheets

(56) References Cited

U.S. PATENT DOCUMENTS

| | | |
|---|---|---|
| 8,204,727 B2 | 6/2012 | Dean et al. |
| 8,271,243 B2 | 9/2012 | Bryant et al. |
| 8,423,337 B2 | 4/2013 | Duffy et al. |
| 8,768,672 B2 | 7/2014 | Hsu et al. |
| 9,058,445 B2 | 6/2015 | Li et al. |
| 9,171,109 B2 | 10/2015 | Hegazy et al. |
| 9,747,393 B2 | 8/2017 | Dasari |
| 10,061,060 B2 | 8/2018 | Branets et al. |
| 10,139,519 B2 | 11/2018 | Lewandowski |
| 10,176,538 B2 | 1/2019 | Ausas et al. |
| 2018/0181693 A1* | 6/2018 | Yang ........................ E21B 41/00 |

* cited by examiner

MODEL FOR COUPLED POROUS FLOW AND GEOMECHANICS FOR SUBSURFACE SIMULATION

CROSS REFERENCE TO RELATED APPLICATION

This application claims the benefit of U.S. Provisional Application No. 62/908,645, filed on Oct. 1, 2019, the disclosure of which is incorporated herein by reference in its entirety.

FIELD OF THE INVENTION

This disclosure relates generally to the field of geophysical prospecting and, more particularly, to geomechanical modeling.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Geomechanics is directed to analyzing behavior of rocks, including compression, expansion and fracture. Over the geological timescale of a prospect or play, sediments are deposited, compacted, lithified, and deformed by tectonic events to produce layers of rocks with highly anisotropic and nonlinear mechanical characteristics. Where reservoirs exist, the fluids they contain, the reservoir rocks themselves, and the formations that surround them form intimately coupled systems.

Thus, reservoir rocks have the ability to store fluids (e.g., water, oil, and gas) inside their pores. In this way, reservoir rocks comprise porous media with hydrocarbons in the pore space. During reservoir production, fluid properties and geomechanical behavior may stress the reservoir, thereby changing the structure and causing rock deformations. In particular, due to stresses, the reservoir rock may compact, potentially damaging well casings and in turn hindering hydrocarbon extraction.

Geomechanical models may simulate the behavior of the formation rock under various circumstances. By relating rock stresses to reservoir properties, the geomechanical model enables the development of mechanical earth models that predict the geomechanical behavior of the formation during various stages of development, including production and injection. In particular, the geomechanical model may detail interactions between pore pressure and the stress state in the rock, which may assist in estimating the changing reservoir stresses due to production of hydrocarbons and changes in porosity, permeability due to stresses. Thus, numerical methods may be used to generate a geomechanical model (interchangeably referred to a reservoir rock model or subsurface rock model) in order to simulate the coupling between the porous flow and mechanical stress state.

SUMMARY OF THE INVENTION

A computer-implemented method for generating a three-dimensional geomechanical model of a subsurface volume is disclosed. The method includes: obtaining mechanical properties and flow properties of the subsurface volume from one or both of seismic data or well log data; defining a grid that comprises a plurality of cells and that is informed of the mechanical properties and the flow properties of the subsurface volume; assign the mechanical properties and the flow properties of the subsurface volume to the plurality of cells of the grid; accessing one or more initial conditions for the subsurface volume; accessing one or more governing equations of the geomechanical model representing poroelastic behavior; determining, using the geomechanical model and the one or more initial conditions, one or both of rock displacement or pressure by solving, in combination and on the defined grid, both momentum balance at one part of the plurality of cells on the defined grid using a finite element method and mass balance using finite volume method at another part of the plurality of cells on the defined grid; and using the determined one or both of the rock displacement or the pressure for hydrocarbon management.

DESCRIPTION OF THE FIGURES

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

DETAILED DESCRIPTION OF THE INVENTION

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

The term "seismic data" as used herein broadly means any data received and/or recorded as part of the seismic surveying process, including particle displacement, velocity and/or acceleration, pressure and/or rotation, wave reflection, and/or refraction data. "Seismic data" is also intended to include any data (e.g., seismic image, migration image, reverse-time migration image, pre-stack image, partially-stack image, full-stack image, post-stack image or seismic attribute image) or properties, including geophysical properties such as one or more of: elastic properties (e.g., P and/or S wave velocity, P-Impedance, S-Impedance, density, attenuation, anisotropy and the like); and porosity, permeability or the like, that the ordinarily skilled artisan at the time of this disclosure will recognize may be inferred or otherwise derived from such data received and/or recorded as part of the seismic surveying process. Thus, this disclosure may at times refer to "seismic data and/or data derived therefrom," or equivalently simply to "seismic data." Both terms are intended to include both measured/recorded seismic data and such derived data, unless the context clearly indicates that only one or the other is intended. "Seismic data" may also include data derived from traditional seismic (i.e., acoustic) data sets in conjunction with other geophysical data, including, for example, gravity plus seismic; gravity plus electromagnetic plus seismic data, etc. For example, joint-inversion utilizes multiple geophysical data types.

Reservoir model is a geological model of the reservoir, which is a subsurface area that is composed of rock and may be sufficiently porous to store fluids (e.g., water, oil, and gas) therein.

"Finite element method" is a numerical method for solving initial and boundary value problems for partial differential equations in engineering and mathematical physics. In the finite element method, the subsurface volume subject to analysis may be divided into sub-regions, called elements, and may be based on the seismic data, as discussed further below. In the finite element method, the subsurface volume may be represented by functions defined over each element. As discussed further below, the functions generate a number of local functions that are less complicated than those which would be required to represent the entire region.

"Finite difference method" is a numerical method for solving differential equations by approximating them with difference equations, in which finite differences approximate the derivatives. Thus, the finite difference method converts differential equations (e.g., partial or ordinary) into a system of equations, which may then be solved by matrix algebra techniques.

"Finite volume method" is a numerical method for representing and evaluating partial differential equations in the form of algebraic equations. Similar to the finite difference method or finite element method, values are calculated at discrete locations on a meshed geometry. "Finite volume" refers to the small volume surrounding each node point on a mesh.

"Stress" is a measure of inter-particle forces arising within a body of material resisting deformation and/or distortion, in response to a stress-inducing force applied to the body, as particles within the body of material work to resist separation, compression and/or sliding.

"Poisson Ratio" means, for a substantially elastic body of material when placed under a substantially uniaxial stress, the ratio of the strain normal to the uniaxial stress to the strain parallel to the uniaxial stress.

"Elastic modulus" (also known as modulus of elasticity) means a quantity that measures an object or substance's resistance to being deformed elastically (e.g., non-permanently) when a stress is applied to it.

"Elastic" means a body of material capable of sustaining deformation and/or distortion without permanent loss of size or shape in response to a stress-inducing force, whether the body's response is linear elastic or non-linear elastic.

"Inelastic" or "Plastic" means that any deformation and/or distortion to a body of material subjected to a stress-inducing force is permanent, e.g. deformation/distortion remains after the force is removed.

"Strain" means a measure of the extent to which a body of material is deformed and/or distorted when it is subjected to a stress-inducing force. "Stress-Inducing Force" refers to an action of at least one force, load and/or constraint on a body of material that tends to strain the body. Examples of the body's deformation or distortion (e.g., the rock's deformation or distortion) may include, without limitation, changes in the body's length (e.g., linear strain), volume (e.g., bulk strain) and/or a lateral displacement between two substantially parallel planes of material within the body (e.g., shear strain).

"Subsurface" means beneath the top surface of any mass of land at any elevation or over a range of elevations, whether above, below or at sea level, and/or beneath the floor surface of any mass of water, whether above, below or at sea level.

"Biot coefficient" is defined by the ratio of drained bulk modulus of rock to the poroelastic expansion coefficient. It describes the change in bulk volume due to a pore pressure change while the stress remains constant.

"Pore pressure" means the pressure within the pores of a part of the subsurface, such as a reservoir. For example, the reservoir may be subject to one or more stresses, such as due to in-situ tectonic stress and/or due to the presence of fluids residing within interstitial pore spaces. The in situ hydrocarbons may provide pore pressure, which acts against the overburden and supports the rock strata above the formation.

"Hydrocarbon management" or "managing hydrocarbons" includes any one, any combination, or all of the following: hydrocarbon extraction; hydrocarbon production (e.g., drilling a well and prospecting for, and/or producing, hydrocarbons using the well; and/or, causing a well to be drilled, e.g., to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities, such activities typically taking place with respect to a subsurface formation. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.). Hydrocarbon management may include reservoir surveillance and/or geophysical optimization. For example, reservoir surveillance data may include, well production rates (how much water, oil, or gas is extracted over time), well injection rates (how much water or $CO_2$ is injected over time), well pressure history, and time-lapse geophysical data. As another example, geophysical optimization may include a variety of methods geared to find an optimum model (and/or a series of models which orbit the optimum model) that is consistent with observed/measured geophysical data and geologic experience, process, and/or observation.

"Obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

A "gather" refers to a display of seismic traces that share an acquisition parameter. For example, a common midpoint gather contains traces having a common midpoint, while a common shot gather contains traces having a common shot.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

If there is any conflict in the usages of a word or term in this specification and one or more patent or other documents that may be incorporated herein by reference, the definitions that are consistent with this specification should be adopted for the purposes of understanding this disclosure.

As discussed in the background, hydrocarbon production from the reservoir may change the stress state of the reservoir, which may damage the completion assemblies forming the wells and/or may cause compaction of the subsurface formation in response to the increased stress. Conversely, injection, which may comprise injecting steam or brine for enhanced oil recovery, may cause an increase in pore pressure within the targeted formation. This, in turn, may create stresses in the formation that may affect wellbore casings and/or may cause heave at the surface of the earth.

Thus, a geomechanical model may be used to predict changes in geomechanical stress, which may be caused by extraction from or injection into the reservoir. For example, the geomechanical model may be configured to predict the likelihood or extent of earth movement as a result of subsidence or heave. In some instances, earth movement is sought to be controlled in order to avoid environmental or hydrogeological impact. In this respect, changing the contour and relief of the earth surface may change runoff patterns, affect vegetation patterns, and impact watersheds.

Alternatively, or in addition, the geomechanical model may predict local changes in the in-situ state of stress and the impact of such changes on well integrity over the life of reservoir production. Subsidence particularly has the potential of damaging production wells formed in a production area.

The geomechanical model may be generated using one of several approaches. The approach selected may be based on any one, any combination, or all of: a preference on numerical discretization for porous flow and mechanical deformation; solver scheme; inputs to the model; and approximation in poro-mechanics. Further, the geomechanical model may solve rock displacement and pore flow.

Various numerical methods may be used to solve the governing equations for fluid flow and mechanical deformation. Some embodiments include purely 2D implementations of solving these governing equations to limit computational costs. Other embodiments are directed to solving reservoir flow and mechanical deformation together. Other approaches solve the reservoir flow and mechanical deformation sequentially with or without iterations to converge the solution at each time step. In some or all of these methodologies, the reservoir flow involves multiple components and phases, with miscible or immiscible properties, one or more wells for injection, one or more wells for production, a facility network to connect all the wells and pipelines, etc. When all these complexities are combined, the reservoir flow itself becomes computationally intensive. The coupling of such model with mechanical deformation, either fully coupled (solving both simultaneously) or staggered/iteratively coupled (solving one after the other in cyclic steps, until both converge to unique solution) makes it more computationally intensive. Another approach to this problem is to keep the reservoir simulation apart and solve the poroelastic equation (geomechanics solver which may be directed to the interaction between fluid flow and solids deformation) with simplified porous flow such as single phase, without production wells and facility network etc. In so doing, the reservoir simulation maintains higher fidelity for porous flow and the geomechanics simulation maintains higher fidelity for deformation and stress calculations. In such paradigms, a key challenge is to model the simplified pore flow and rock deformation in an accurate numerical scheme.

Various numerical methods may be used to solve the governing equations for rock displacement and pore flow. The finite element method is best suited to solve the mechanical deformation equations given its best approximation property and its applicability to completely unstructured grids. On the other hand, the locally conservative nature of the finite volume method makes it more suitable for solving the governing equations of pore flow.

In one or some embodiments, the geomechanical model is generated by solving, in combination, the finite element method at one, some or all of the vertices of a respective cell (e.g., along a discrete set of points of a perimeter of the respective cell) for momentum balance (and in turn rock displacement) and the finite volume method at an interior, such as the center (e.g., the geometric center) of the respective cell for mass balance (and in turn pore flow).

In addition, the finite element method and the finite volume method may be solved in combination in one of several ways. In one or some embodiments, the same grid, such as the same 3D grid, may be used to solve the finite element method and the finite volume method in combination. As one example, a same matrix, solving for both the finite element method and the finite volume method, may be used. In particular, the momentum balance (using the finite element method) and the mass balance (using the finite volume method) of the combined system may be solved together in the same matrix. As another example, one of the finite element method or the finite volume method may be solved for a certain variable, with the solution being input to the other of the finite element method or the finite volume method. For example, the finite element method may be solved for a certain variable (e.g., displacements), which in turn may be used to solve the finite volume method of another variable (e.g., pressure). This procedure may be iteratively performed (e.g., using the solution for the pressure to iteratively solve the finite element method) until both the finite element method and the finite volume method are satisfied. Though, the iterative solution may take longer than the simultaneous solution. Alternatively, different grids may be used to solve the finite element method and the finite volume method in combination. In particular, when using different grids (a finite element grid for solving the finite element method and a finite volume grid for solving the finite volume method), the methodology may map the solution from the finite element grid to the finite volume grid (or vice-versa), in order to solve the finite element method and the finite volume method in combination.

In one or some embodiments, the geomechanical model may receive input from other models. For example, one or more variables, such as pressure, may be input from a reservoir model as an initial condition to solve for the stress state and consequently return updated porosity and permeability to the reservoir simulator. However, in some embodiments, there is no iteration between the geomechanical model and the reservoir model at the same time step.

In one or some embodiments, the geomechanical model and the reservoir model are distinctly defined and separate models. In particular, the reservoir model is configured to model a multi-phase and a multi-component porous medium flow and is not configured to model deformation of the rock or any mechanical components associated thereto. Example of reservoir models are disclosed in U.S. Pat. Nos. 7,844,430, 9,058,445 and 10,061,060, each of which are incorporated by reference herein in their entirety. In this regard, the reservoir model is directed to the purely mass balance flow problem, with multiple components and multiple phases therein. In contrast, the geomechanical model is configured to determine one or both of the rock displacement or pressure. Example of geomechanical models are disclosed in U.S. Pat. Nos. 8,423,337, 8,768,672, and 9,747,393, each of which are incorporated by reference herein in their entirety. In this regard, the geomechanical model is directed to different activity than the reservoir model, such as directed to the movement of fluid and the attendant pressure, instead of to phase changes, dissolution in the fluid, condensates, or the like.

Specifically, the geomechanical model may model the porous medium and flow; however, in this aspect, the modeling is simpler as being directed to single phase/single component or single phase/multiple component (as opposed to the reservoir model, which is directed to multiple phase/multiple component). Thus, the pore flow for the geomechanical model is directed to poro-mechanical response, and is not directed to production scenarios.

As discussed above, the reservoir model may provide an initial pressure as input to the geomechanical model. The initial pressure output from the reservoir does not account for the geomechanics. Nevertheless, the geomechanical model may use the initial pressure input in order to determine one or both of the rock displacement or the geomechanical pressure. Further, the reservoir model and the geomechanical model, both in their respective equations as well as their respective solutions, may be decoupled. As one example, the reservoir model may be separately configured from the geomechanical model (e.g., separate sets of defining equations). Further, the reservoir model may be configured to simulate conditions in order to generate the initial pressure, with the solution or the initial pressure needing not to be solved at a same time step as the solution generated by the geomechanical model.

Figure 1:
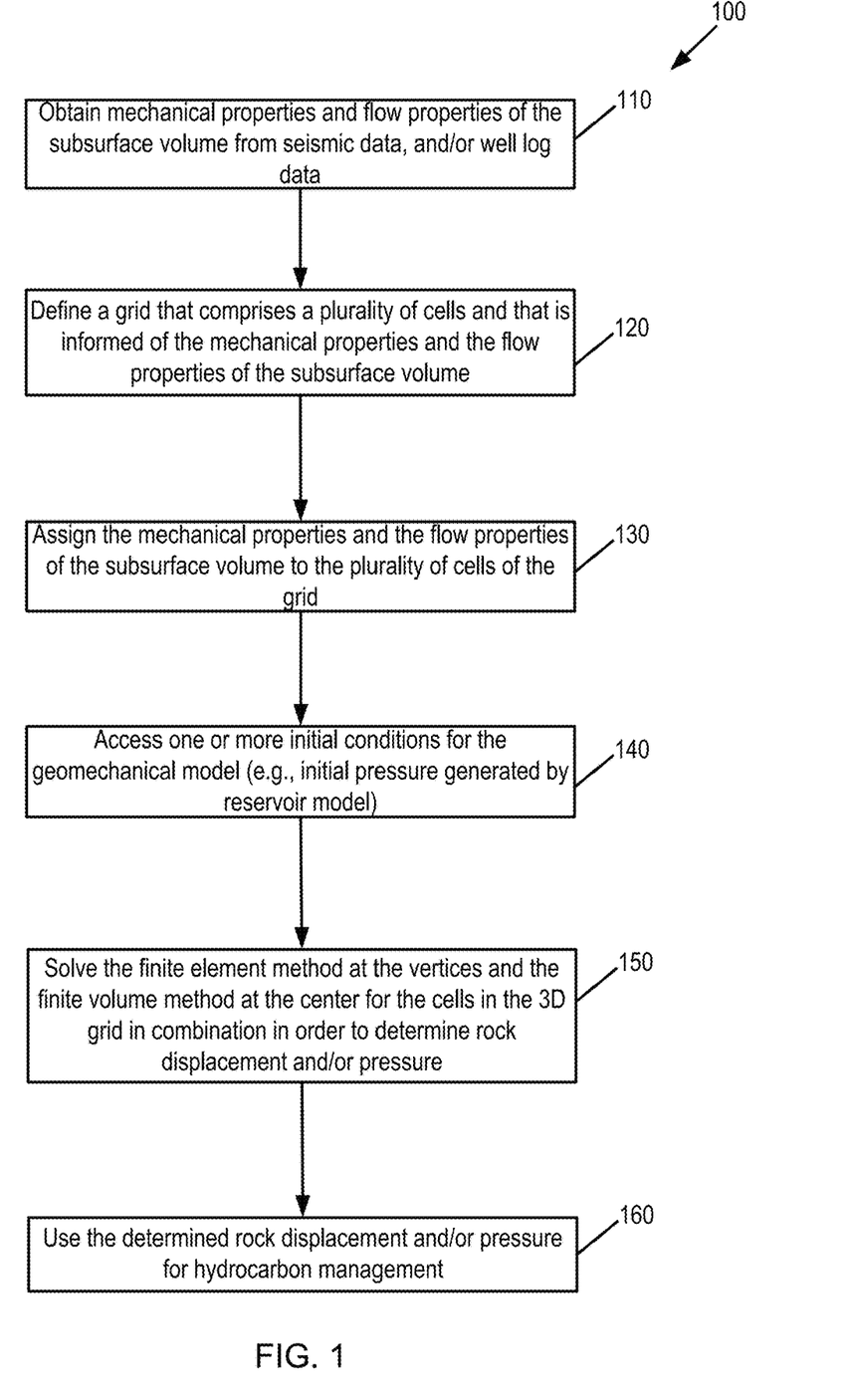
FIG. 1 is a flow diagram for determining and using rock displacement for hydrocarbon management.

Referring to the figures, FIG. 1 is a flow diagram 100 for determining and using rock displacement and/or geomechanical pressure for hydrocarbon management. At 110, mechanical properties and flow properties of the subsurface volume are obtained from seismic data, and/or well log data. At 120, a grid is defined that comprises a plurality of cells and that is informed of the mechanical properties and the flow properties of the subsurface volume. At 130, the mechanical properties and the flow properties of the subsurface volume are assigned to the plurality of cells of the grid For example, a 3D grid may be defined based on analysis of the seismic and well log data. In particular, seismic data may be analyzed in order to identify various features of the subsurface, such as the materials (e.g., types of rocks) within a particular volume of the subsurface, faults in the subsurface (e.g., a fracture or zone of fractures between two blocks of rock), planes or layers in the subsurface, or the like. Example features of the subsurface may include any one, any combination, or all of: layers of rock properties (e.g., for elastic material, the elastic modulus and the Poisson ratio; density of the rock material, pointwise or layer-wise); porous flow variables (e.g., permeability, porosity, viscosity and fluid saturations (multi-phase)); coupling inputs (e.g., the Biot coefficient, pore and granular compressibility moduli); etc.

Typically, the interpreted seismic data and/or well logs may define an unstructured grid in 3D space, which may comprise various shapes (e.g., tetrahedron, hexahedral, etc.). For example, the mechanical properties and/or the flow properties, gleaned from the seismic data and/or the well log data, may first be used in order to define the grid, such as the fineness of the cells in the grid. Thereafter, the mechanical properties and/or the flow properties may be assigned to the cells in the grid.

Further, at 140, one or more initial conditions may be accessed. As one example, the initial stress state in one, two or three principal directions may be input to the geomechanical model. As another example, an initial pore pressure state for the geomechanical model domain may likewise be input. In particular, the initial pore pressure may be estimated from one of several sources, such as a 1-D model or a reservoir production simulation, in order to incorporate the pore pressure field in the geomechanical model domain.

At 150, the finite element method at the vertices and the finite volume method at the center for the cells in the 3D grid may be solved in combination in order to determine rock displacement and/or pressure. In this way, the geomechanical model may be used to determine one or both of the rock displacement or geomechanical pressure by solving, in combination and on the defined grid, both the momentum balance at one part of the plurality of cells (e.g., at the vertices of the cells) on the defined grid using a finite element method and mass balance using finite volume method at another part of the plurality of cells (e.g., at an interior of the cells, such as the geometric center of the cells) on the same defined grid. For example, the center of a cell, which may comprise a general polygon, may be defined in one of several ways, such as the vertex centroid (by considering the polygon as being empty but having equal masses at its vertices), the side centroid (by considering the sides of the polygon as having constant mass per unit length), or the centroid (or center of area) (by considering the surface of the polygon as having constant density). After which, at 160, the determined rock displacement and/or pressure may be used for hydrocarbon management.

As discussed above, the porous flow governed by the fluid mass balance may be modeled using a finite volume method on the same grid used for geomechanics problem governed by the momentum balance. The momentum balance may be represented by the following:

$$\nabla \cdot (\sigma' - bpI) = 0 \qquad (1)$$

where $\sigma'$ is effective stress (positive in tension), b is Biot coefficient, p is pore pressure (positive in compression), I is Identity matrix. The stress $\sigma'$ is related to strain through an elastic or inelastic constitutive relation.

A constitutive equation relates the stress state in the rock, $\sigma$ in Equation (1), to the strains in the rock. For example, one elastic constitutive relation is given by $\sigma' = C:\epsilon$ where C is elastic modulus tensor and $\epsilon$ is rock strain. Finally, the strains E and the displacements u are related as:

$$\epsilon = \tfrac{1}{2}[\text{grad}(u) + (\text{grad}(u))^T] \qquad (2).$$

The porous flow governing equation may then be represented as:

$$\frac{1}{M}\frac{\partial p}{\partial t} + b\nabla \cdot v_s + \nabla \cdot (k\nabla p) = 0 \qquad (3)$$

where M is the Biot's modulus, $v_s$ is the velocity of rock, and k is the permeability of flow in the rock. Equation (2) may be written in multiple forms, such as based on compressibility, incorporating gravity, single/multiple phases of fluid, etc. In this regard, the disclosed equations are merely illustrative.

Figure 2:
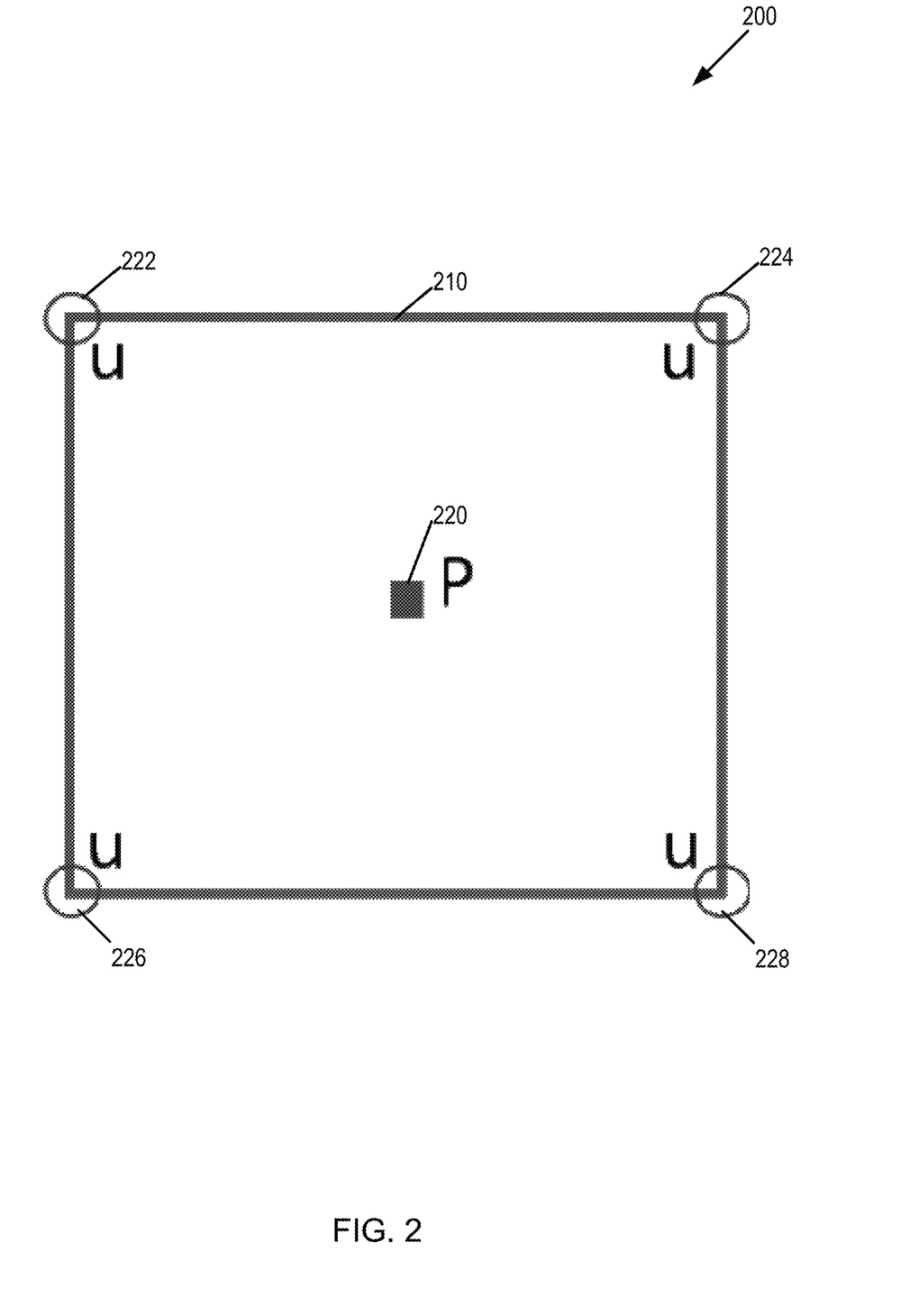
FIG. 2 is a diagram illustrating locations of displacement (u) and pressure (P) in a grid cell.

Thus, Equation (1) represents the momentum balance determination, which may be solved using the finite element method for determining rock displacement while Equation (3) represents the mass balance determination, which may be solved using the finite volume method for determining pore flow. The mass balance of Equation (3) may be solved with a finite volume discretization for pressure at the center of the cell. This is illustrated in FIG. 2, which is a diagram 200 illustrating the location pressure (P) 220 in a center of grid cell 210. The flux across cells may be computed by either a 2-point flux approximation or a multi-point flux approximation. The momentum balance of Equation (1) may be solved using finite element discretization for rock displacements at the corners of the cell. This is illustrated in FIG. 2 at locations of displacement (u) 222, 224, 226, 228 at vertices of the grid cell 210. The governing equations for mass and momentum balance may be solved such that the residual vectors resulting from them are driven to zero simultaneously. In other words, given a solution vector $y^n = \{u^n, p^n\}$ at time $t^n$, an update to the solution is obtained by solving:

$$R(y^{n+1}) = \begin{bmatrix} R_{momentum} \\ R_{mass} \end{bmatrix} = 0. \qquad (4)$$

An iterative Newton-Raphson procedure may be used to solve for the incremental update, such that:

$$J_k \Delta y_k = -R_k \qquad (5)$$

where k represents the iteration counter. The updated solution may then be represented by:

$$y_{k+1}^{n+1} = y_k^n + \Delta y \qquad (6).$$

The iterative update is continued until Equation (4) is satisfied to a desired tolerance. The Jacobian matrix $J_k$ may evaluated at the iteration, k, and may be represented by the following 2×2 block structure:

$$J_k = \begin{bmatrix} \partial R_{momentum}/\partial u & \partial R_{momentum}/\partial p \\ \partial R_{mass}/\partial u & \partial R_{mass}/\partial p \end{bmatrix}. \qquad (7)$$

The momentum and mass residuals result from the Galerkin finite element and finite volume discretizations, respectively. Further, the global residual vectors are given by assembling the following element level contributions:

$$r_{momentum}^e = \int_{\Omega^e} \nabla w:(\sigma')^{n+1} d\Omega - \int_{\Omega^e} bp^{n+1}\nabla \cdot w d\Omega - \int_{\Gamma_t^e} w \cdot \bar{t} d\Gamma \qquad (8)$$

$$r_{mass}^e = \int_{\Omega^e} \frac{1}{M}(p)^{n+1} d\Omega + \int_{\Omega^e} b\nabla \cdot (\dot{u})^{n+1} d\Omega + \int_{\partial\Omega^e} k\nabla p \cdot n d\Gamma. \qquad (9)$$

Thus, every cell in the unstructured 3D grid may have a corresponding representation in Equations (8) and (9). The two equations, for each cell, form a linear set of equations in order to solve for the model (e.g., solving in order to obtain displacement at a vertex in a designated cell and/or pressure at the center of the designated cell). Specifically, R in Equation (5) is assembled using Equations (8) and (9) and J in Equation (5) is assembled using Equation (7). In this way, the solution update $\Delta y$ in Equation (5) may be solved. Thus, the matrices may be solved simultaneously. Alternatively, an iterative solution may be generated, as discussed above.

As discussed above, the spatial volume may be discretized using the grid. Similarly, the time domain may be discretized in one of several ways. For example, a backward-Euler time stepping scheme may be used for temporal discretization.

Figure 3A:
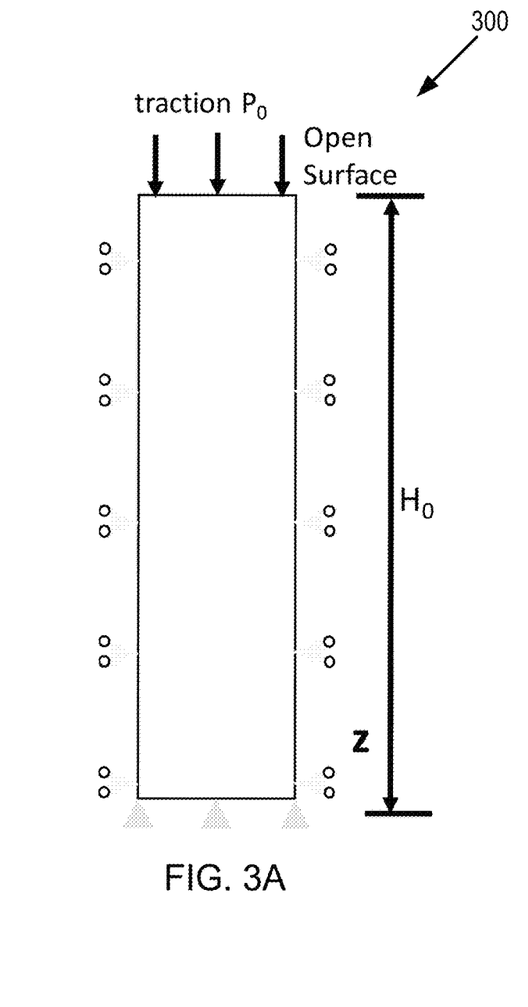
FIG. 3A is a block diagram and FIG. 3B is a graph illustrating benchmarking applying the geomechanical model to the Terzaghi consolidation problem.
Figure 3B:
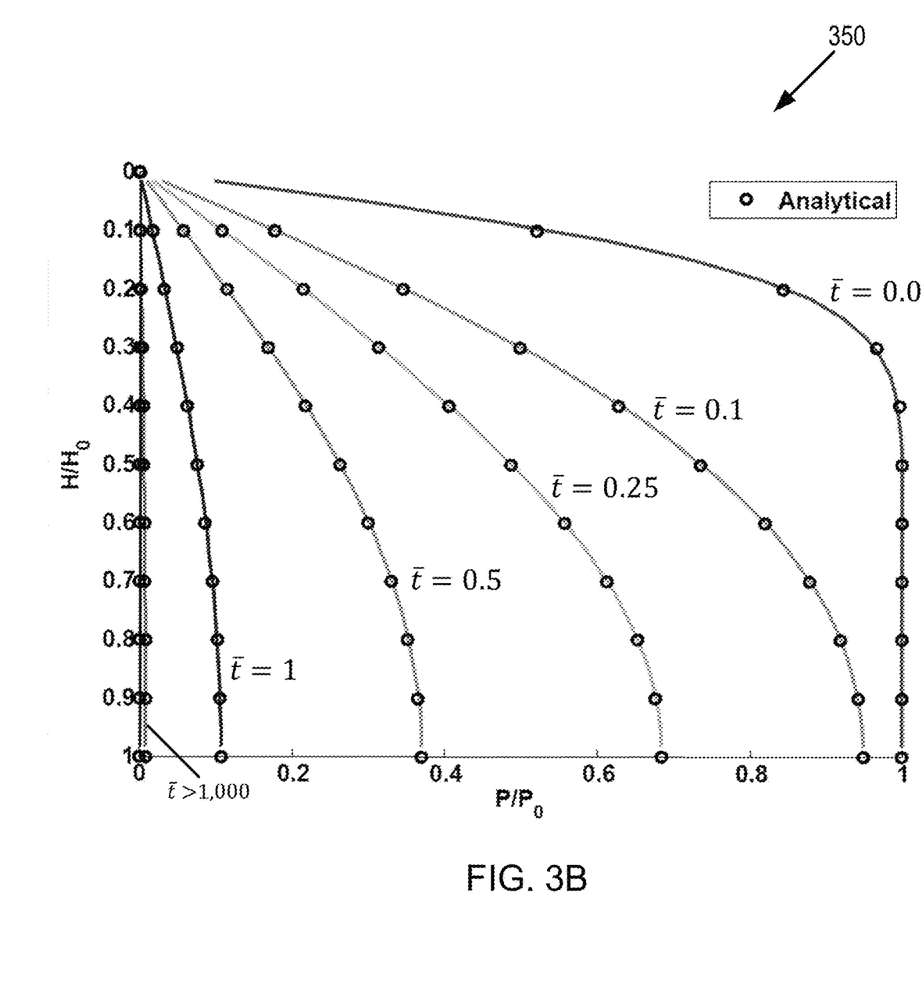

The disclosed methodology may be compared with known solutions in for validating the disclosed methodology. For example, FIG. 3A is a block diagram 300 of a cross section of the surface and subsurface along a height $H_0$, and FIG. 3B is a graph 350 illustrating benchmarking applying the geomechanical model to the Terzaghi consolidation problem. The Terzaghi consolidation problem states that all quantifiable changes in stress to a soil, such as compression, deformation, shear resistance, are a direct result of a change in effective stress, and follows the following:

$$\bar{p}(\bar{z}, \bar{t}) = \sum_{n=0}^{n=\infty} \frac{4}{\pi(2n+1)} \sin\left(\frac{(2n+1)\pi}{2}\bar{z}\right) \exp\left(-\frac{(2n+1)^2 \pi^2}{4} \bar{t}\right). \qquad (10)$$

Traction $P_0$ illustrated in FIG. 3A is the traction or external load that is applied to the open surface. The graph 350 in FIG. 3B includes analytical points which are derived from the above-equation, and a series of curves at different time steps (e.g., $\bar{t}=0.01$; $\bar{t}=0.1$; $\bar{t}=0.25$; $\bar{t}=0.5$; $\bar{t}=1$; $\bar{t}>1,000$) generated by the disclosed methodology. As shown, the lines track the analytical points, indicating that the disclosed methodology is consistent with the known response under the Terzaghi consolidation problem.

Figure 4A:
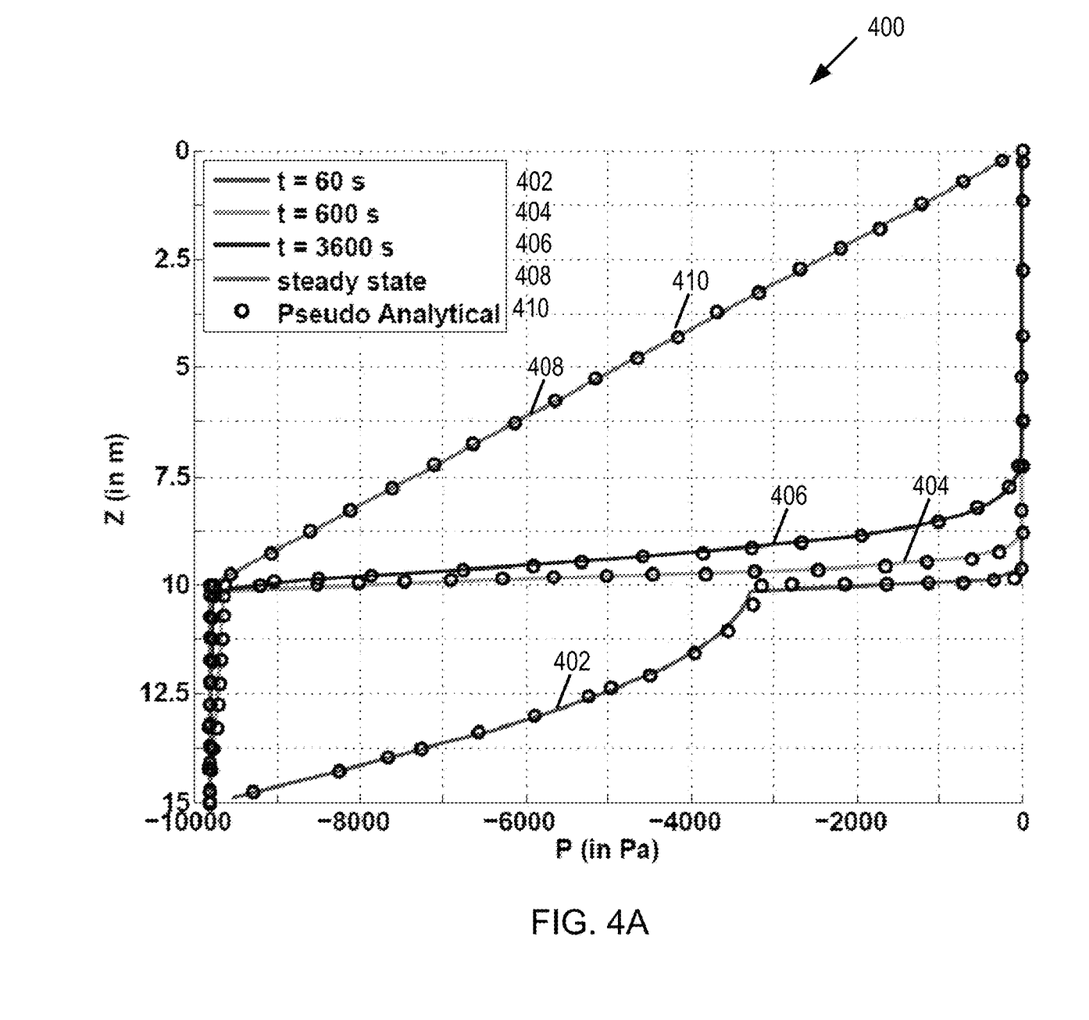
FIG. 4A is a graph and FIG. 4B is a block diagram illustrating benchmarking applying the geomechanical model to the heterogeneous consolidation problem.
Figure 4B:
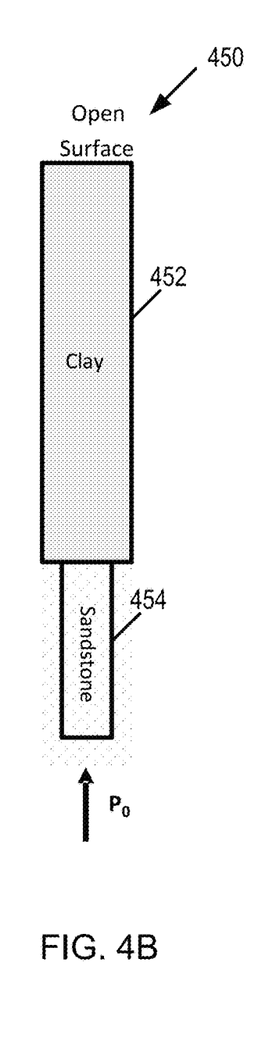

As another example, FIG. 4A is a graph 400 and FIG. 4B is a block diagram 450 illustrating benchmarking applying the geomechanical model to the heterogeneous consolidation problem, which is directed to multiple layers with different material properties. In particular, FIG. 4B illustrates an open surface, clay 452, sandstone 454, and pressure $P_0$. A discussion of the heterogeneous consolidation problem is in Massimiliano Ferronato et al., "A fully coupled 3-D mixed finite element model of Biot consolidation", Journal of Computational Physics, Vol. 229, Issue 12, pg. 4813-4830 (Jun. 20, 2010). Similar to FIG. 3B, the graph 400 in FIG. 4A includes pseudo analytical points 410 which are derived from the heterogeneous consolidation problem, and a series of curves at different time steps (e.g., t=60 s (402); t=600 s (404); t=3600 s (406); steady state (408)) generated by the disclosed methodology. As shown, the lines track the analytical points, indicating that the disclosed methodology is consistent with the known response under the heterogeneous consolidation problem.

Figure 5:
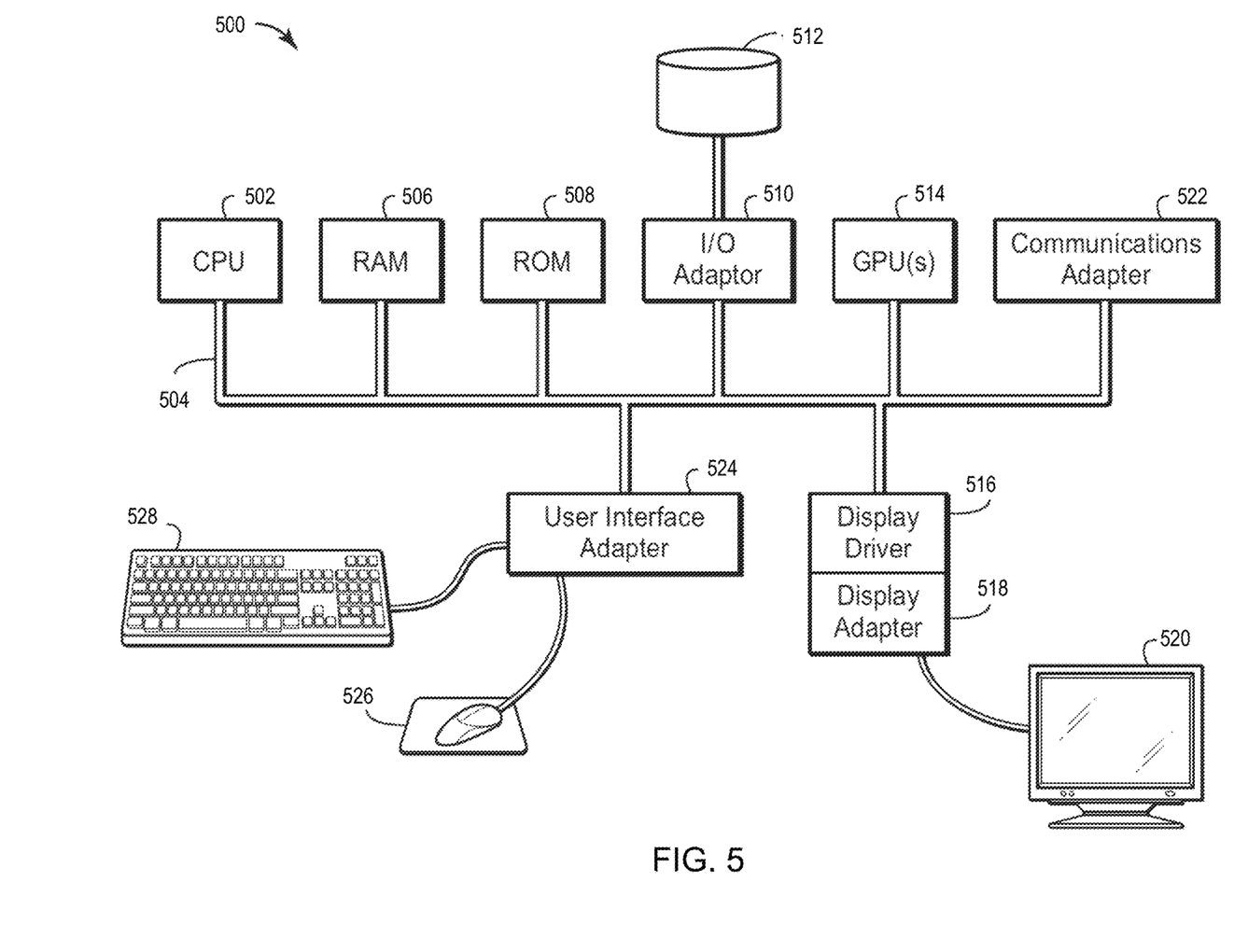
FIG. 5 is a diagram of an exemplary computer system that may be utilized to implement the methods described herein.

In all practical applications, the present technological advancement must be used in conjunction with a computer, programmed in accordance with the disclosures herein. For example, FIG. 5 is a diagram of an exemplary computer system 500 that may be utilized to implement methods described herein. A central processing unit (CPU) 502 is coupled to system bus 504. The CPU 502 may be any general-purpose CPU, although other types of architectures of CPU 502 (or other components of exemplary computer system 500) may be used as long as CPU 502 (and other components of computer system 500) supports the operations as described herein. Those of ordinary skill in the art will appreciate that, while only a single CPU 502 is shown in FIG. 5, additional CPUs may be present. Moreover, the computer system 500 may comprise a networked, multi-processor computer system that may include a hybrid parallel CPU/GPU system. The CPU 502 may execute the various logical instructions according to various teachings disclosed herein. For example, the CPU 502 may execute machine-level instructions for performing processing according to the operational flow described.

The computer system 500 may also include computer components such as non-transitory, computer-readable media. Examples of computer-readable media include a random access memory (RAM) 506, which may be SRAM, DRAM, SDRAM, or the like. The computer system 500 may also include additional non-transitory, computer-readable media such as a read-only memory (ROM) 508, which may be PROM, EPROM, EEPROM, or the like. RAM 506 and ROM 508 hold user and system data and programs, as is known in the art. The computer system 500 may also include an input/output (I/O) adapter 510, a graphics processing unit (GPU) 514, a communications adapter 522, a user interface adapter 524, a display driver 516, and a display adapter 518.

The I/O adapter 510 may connect additional non-transitory, computer-readable media such as storage device(s) 512, including, for example, a hard drive, a compact disc (CD) drive, a floppy disk drive, a tape drive, and the like to computer system 500. The storage device(s) may be used when RAM 506 is insufficient for the memory requirements associated with storing data for operations of the present techniques. The data storage of the computer system 500 may be used for storing information and/or other data used or generated as disclosed herein. For example, storage device(s) 512 may be used to store configuration information or additional plug-ins in accordance with the present techniques. Further, user interface adapter 524 couples user input devices, such as a keyboard 528, a pointing device 526 and/or output devices to the computer system 500. The display adapter 518 is driven by the CPU 502 to control the display on a display device 520 to, for example, present information to the user such as subsurface images generated according to methods described herein.

The architecture of computer system 500 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 500 may include various plug-ins and library files. Input data may additionally include configuration information.

Preferably, the computer is a high performance computer (HPC), known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM or other cloud computing based vendors such as Microsoft, Amazon.

The above-described techniques, and/or systems implementing such techniques, can further include hydrocarbon management based at least in part upon the above techniques, including using the one or more generated geological models in one or more aspects of hydrocarbon management. For instance, methods according to various embodiments may include managing hydrocarbons based at least in part upon the one or more generated geological models and data representations (e.g., seismic images, feature probability maps, feature objects, etc.) constructed according to the above-described methods. In particular, such methods may include drilling a well, and/or causing a well to be drilled, based at least in part upon the one or more generated geological models and data representations discussed herein (e.g., such that the well is located based at least in part upon a location determined from the models and/or data representations, which location may optionally be informed by other inputs, data, and/or analyses, as well) and further prospecting for and/or producing hydrocarbons using the well. For example, the different stages of exploration may result in data being generated in the respective stages, which may be iteratively used by the machine learning to generate the one or more geological models discussed herein.

It is intended that the foregoing detailed description be understood as an illustration of selected forms that the invention can take and not as a definition of the invention. It is only the following claims, including all equivalents, which are intended to define the scope of the claimed invention. Further, it should be noted that any aspect of any of the preferred embodiments described herein may be used alone or in combination with one another. Finally, persons skilled in the art will readily recognize that in preferred implementation, some or all of the steps in the disclosed method are performed using a computer so that the methodology is computer implemented. In such cases, the resulting physical properties model may be downloaded or saved to computer storage.

The following example embodiments of the invention are also disclosed:

Embodiment 1. A computer-implemented method for generating a three-dimensional geomechanical model of a subsurface volume, the method comprising:
obtaining mechanical properties and flow properties of the subsurface volume from one or both of seismic data or well log data;
defining a grid that comprises a plurality of cells and that is informed of the mechanical properties and the flow properties of the subsurface volume;
assign the mechanical properties and the flow properties of the subsurface volume to the plurality of cells of the grid;
accessing one or more initial conditions for the subsurface volume;
accessing one or more governing equations of the geomechanical model representing poroelastic behavior;
determining, using the geomechanical model and the one or more initial conditions, one or both of rock displacement or pressure by solving, in combination and on the defined grid, both momentum balance at one part of the plurality of cells on the defined grid using a finite element method and mass balance using finite volume method at another part of the plurality of cells on the defined grid; and
using the determined one or both of the rock displacement or the pressure for hydrocarbon management.

Embodiment 2. The method of embodiment 1:
wherein the one or more initial conditions comprise initial stresses and pore pressure.

Embodiment 3. The method of embodiments 1 or 2:
wherein the poroelastic behavior comprises rock displacement and pore flow.

Embodiment 4. The method of embodiments 1-3:
wherein the defined grid comprises an unstructured grid.

Embodiment 5. The method of embodiments 1-4:
wherein the one part of the plurality of cells comprises vertices of the plurality of cells; and
wherein the another part of the plurality of cells comprises an interior of the plurality of cells.

Embodiment 6. The method of embodiments 1-5:
wherein the finite element method is solved at each of the vertices for a respective cell of the plurality of cells.

Embodiment 7. The method of embodiments 1-6:
wherein the interior of the plurality of cells comprises a center of the plurality of cells.

Embodiment 8. The method of embodiments 1-7:
wherein the plurality of cells comprise a plurality of polygons; and
wherein the center of the plurality of cells comprises a centroid of the plurality of the polygons.

Embodiment 9. The method of embodiments 1-8:
wherein the momentum balance and the mass balance are solved in combination by using a same matrix populated with equations for the finite element method at the vertices and equations for the finite volume method at the center for the plurality of cells.

Embodiment 10. The method of embodiments 1-9:
wherein the momentum balance and the mass balance are solved in a same matrix iteratively.

Embodiment 11. The method of claim 1-10:
wherein the one or more governing equations for mass and momentum balance are solved such that residual vectors resulting from the one or more governing equations are driven to zero simultaneously.

Embodiment 12. The method of embodiments 1-11:
wherein the rock displacement is solved with the finite element method while the pressure is solved with the finite volume method on the defined grid.

Embodiment 13. The method of embodiments 1-12:
wherein the grid comprises a 3-dimensional grid such that the plurality of cells comprise a volume.

Embodiment 14. The method of embodiments 1-13:
wherein the one or more initial conditions are generated by a reservoir model.

Embodiment 15. The method of embodiments 1-14:
wherein the reservoir model is separate from the geomechanical model, defined by different equations than the geomechanical model, and solved separately from the geomechanical model.

Embodiment 16. The method of embodiments 1-15:
wherein the reservoir model generates the one or more initial conditions with no iteration between the reservoir model and the geomechanical model at a same time step.

Embodiment 17. The method of embodiments 1-16:
wherein the reservoir model is configured to model a multi-phase flow; and
wherein the geomechanical model is configured to model a single-phase flow.

Embodiment 18. The method of embodiments 1-17:
wherein the reservoir model is further configured to model a multi-component flow; and
wherein the geomechanical model is configured to model a single-component flow.

Embodiment 19. The method of embodiments 1-18:
wherein solving both momentum balance at one part of the plurality of cells on the defined grid using a finite element method and mass balance using finite volume method at another part of the plurality of cells on the defined grid comprises solving governing equations for the mass balance using the finite volume method and governing equations for the momentum balance using the finite element method such that residual vectors resulting from the governing equations for the mass balance and the governing equations for the momentum balance are driven to zero simultaneously.

Embodiment 20. The method of embodiments 1-19:
wherein the one part of the plurality of cells comprises a perimeter; and
wherein the another part of the plurality of cells comprises an interior.

Embodiment 21. One or more non-transitory computer-readable media storing computer-executable instructions for causing one or more processors performance of a method according to any of embodiments 1-20.

Embodiment 22. A system, comprising: one or more processors, the one or more processors programmed to perform a method according to any of embodiments 1-20.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A method for producing hydrocarbons from a subsurface formation, the method comprising:
   obtaining mechanical properties and flow properties of a subsurface volume from one or both of seismic data or well log data;
   defining a grid that comprises a plurality of cells and that is informed of the mechanical properties and the flow properties of the subsurface volume;
   assign the mechanical properties and the flow properties of the subsurface volume to the plurality of cells of the grid;
   accessing one or more initial conditions for the subsurface volume;
   accessing one or more governing equations of a geomechanical model representing poroelastic behavior;
   determining, using the geomechanical model and the one or more initial conditions, one or both of rock displacement or pressure by simultaneously solving, in combination and on the defined grid, both momentum balance at one part of the plurality of cells on the defined grid using a finite element method and mass balance using finite volume method at another part of the plurality of cells on the defined grid, wherein solving both momentum balance at one part of the plurality of cells on the defined grid using a finite element method and mass balance using finite volume method at another part of the plurality of cells on the defined grid comprises solving governing equations for the mass balance using the finite volume method and governing equations for the momentum balance using the finite element method such that residual vectors resulting from the governing equations for the mass balance and the governing equations for the momentum balance are driven to zero simultaneously; and
   producing the hydrocarbons from the subsurface formation using the determined one or both of the rock displacement or the pressure.

2. The method of claim 1, wherein the one or more initial conditions comprise initial stresses and pore pressure.

3. The method of claim 2, wherein the poroelastic behavior comprises rock displacement and pore flow.

4. The method of claim 1, wherein the defined grid comprises an unstructured grid.

5. The method of claim 4, wherein the one part of the plurality of cells comprises vertices of the plurality of cells; and
   wherein the another part of the plurality of cells comprises an interior of the plurality of cells.

6. The method of claim 5, wherein the finite element method is solved at each of the vertices for a respective cell of the plurality of cells.

7. The method of claim 5, wherein the interior of the plurality of cells comprises a center of the plurality of cells.

8. The method of claim 7, wherein the plurality of cells comprise a plurality of polygons; and
   wherein the center of the plurality of cells comprises a centroid of the plurality of the polygons.

9. The method of claim 7, wherein the momentum balance and the mass balance are solved in combination by using a same matrix populated with equations for the finite element method at the vertices and equations for the finite volume method at the center for the plurality of cells.

10. The method of claim 7, wherein the one or more governing equations for mass and momentum balance are solved such that residual vectors resulting from the one or more governing equations are driven to zero simultaneously.

11. The method of claim 10, wherein the rock displacement is solved with the finite element method while the pressure is solved with the finite volume method on the defined grid.

12. The method of claim 7, wherein the grid comprises a 3-dimensional grid such that the plurality of cells comprise a volume.

13. The method of claim 1, wherein the one or more initial conditions are generated by a reservoir model.

14. The method of claim 13, wherein the reservoir model is separate from the geomechanical model, defined by different equations than the geomechanical model, and solved separately from the geomechanical model.

15. The method of claim 14, wherein the reservoir model generates the one or more initial conditions with no iteration between the reservoir model and the geomechanical model at a same time step.

16. The method of claim 15, wherein the reservoir model is configured to model a multiphase flow; and
   wherein the geomechanical model is configured to model a single-phase flow.

17. The method of claim 16, wherein the reservoir model is further configured to model a multi-component flow; and
   wherein the geomechanical model is configured to model a single-component flow.

18. The method of claim 1, wherein the one part of the plurality of cells comprises a perimeter; and
   wherein the another part of the plurality of cells comprises an interior.

* * * * *